United States Patent
Hassan et al.

(10) Patent No.: US 8,130,762 B2
(45) Date of Patent: *Mar. 6, 2012

(54) DISTRIBUTED WIRELESS PACKET ASSEMBLY

(75) Inventors: Ahmed E Hassan, Waterloo (CA); Bo Zou, Waterloo (CA); Ian Patterson, Waterloo (CA)

(73) Assignee: Research In Motion Limited, Waterloo (CA)

( * ) Notice: Subject to any disclaimer, the term of this patent is extended or adjusted under 35 U.S.C. 154(b) by 105 days.

This patent is subject to a terminal disclaimer.

(21) Appl. No.: 12/392,215

(22) Filed: Feb. 25, 2009

(65) Prior Publication Data

US 2009/0268745 A1  Oct. 29, 2009

Related U.S. Application Data

(63) Continuation of application No. 10/786,003, filed on Feb. 26, 2004, now Pat. No. 7,519,063.

(51) Int. Cl.
*H04L 12/28* (2006.01)

(52) U.S. Cl. .......................................... 370/394; 370/401

(58) Field of Classification Search ........................ None
See application file for complete search history.

(56) References Cited

U.S. PATENT DOCUMENTS

| 5,940,371 A * | 8/1999 | Mitts et al. ..................... 370/236 |
| 6,507,572 B1 * | 1/2003 | Kumar et al. .................. 370/335 |
| 7,130,657 B1 * | 10/2006 | Sampath et al. ............... 455/561 |
| 2001/0017850 A1 * | 8/2001 | Kalliokulju et al. ........... 370/331 |
| 2001/0018770 A1 * | 8/2001 | Eryurtlu et al. ................. 725/91 |
| 2001/0043579 A1 | 11/2001 | Tourunen et al. |
| 2004/0131040 A1 * | 7/2004 | Gruhl et al. .................... 370/349 |
| 2007/0178932 A1 * | 8/2007 | Miklos et al. .................. 455/525 |

FOREIGN PATENT DOCUMENTS

EP  1383292 A1  7/2002

OTHER PUBLICATIONS

3GPP Technical Specification 04-65 v8.2.0 (Sep. 2001), "Subnetwork Dependent Convergence Protocol (SNDCP)", (Release 1999).
European Search Report for European Patent Application No. EP 04 25 1089, Sep. 15, 2004.

* cited by examiner

*Primary Examiner* — Yong Zhou

(74) *Attorney, Agent, or Firm* — Ridout & Maybee LLP

(57) ABSTRACT

Distributed assembly of data packets into messages at a group of interface devices that receive data packets from within a coverage area. Each interface device in the group will take ownership of a sequence of data packets forming a message when a data packet of the message meeting predetermined criteria is received by that interface device. Once an interface device takes ownership of a sequence of data packets, it sends a request to the other interface devices for any missing data packets of the sequence that the ownership claiming interface does not have, and then assembles message upon receiving all the data packets of the sequence.

21 Claims, 3 Drawing Sheets

DISTRIBUTED WIRELESS PACKET ASSEMBLY

CROSS REFERENCE TO RELATED APPLICATIONS

This application is a continuation of U.S. patent application Ser. No. 10/786,003 filed Feb. 26, 2004, hereby incorporated by reference in its entirety.

BACKGROUND OF THE INVENTION

The present invention relates to packet assembly in wireless communications networks.

Packet based wireless communications networks often include a gateway that acts an interface between the wireless network and a wired network. Mobile devices that communicate with the wireless network break the data that they are transmitting up into multiple packets, which are sent to network points associated with the gateway, and then the multiple packets are subsequently reassembled. In present systems, a mobile device will typically communicate through a single network point within a coverage area for sending the message. Thus, to send a message, the mobile device breaks the message into multiple packets and sends all the packets to the single network point. In some circumstances, redundancy and scalability requirements may not be adequately be met by using a single network point for an entire message. Additionally, inefficiencies can arise in the event that the mobile device roams from one network point to another, as the message may have to be resent by the mobile device in its entirety to the new network point.

Accordingly, a method and system for assembling data packets received from mobile devices that allows for improved redundancy, efficiency and scalability is desirable.

SUMMARY

According to at least one example is a method and system for distributed assembly of data packets into messages at a group of interface devices that receive data packets from mobile devices within a coverage area. Each interface device in the group will take ownership of a sequence of data packets forming a message when a data packet of the message meeting predetermined criteria is received by that interface device. Once an interface device takes ownership of a sequence of data packets, it sends a request to the other interface devices for any missing data packets of the sequence that the ownership claiming interface does not have, and then assembles message upon receiving all the data packets of the sequence.

According to another example of the invention is, in a communications system having a group of interface devices for assembling messages transmitted as sequences of data packets from within a coverage area of a wireless communications network, a method for assembling a message from a sequence of data packets. The method includes: receiving at one interface device of the group of interface devices from the wireless communications network at least one data packet of a sequence of data packets that collectively form a message; determining if the at least one data packet meets a predetermined criteria and if so sending out a request to the other interface devices of the group for any data packets of the sequence received by the other interface devices and receiving at the one interface device any data packets sent by the other interface devices in response to the request; and assembling the data packets of the sequence into the message at the one interface device.

According to another example of the invention is a gateway for exchanging messages between a packet-based wireless communication network and a second communication network, including a gateway network and a group of interface devices for receiving messages transmitted as sequences of data packets from within a coverage area of the wireless communications network The group of interface devices are coupled to the gateway network for communicating there between. Each of the interface devices including a message assembler for determining if the interface device should assemble a message for a sequence of data packets of which the interface device has received at least one data packet and if so sending out a request for any missing data packets to the other interface devices in the group over the gateway network and assembling the message upon receiving the missing data packets.

Other aspects and features of the present invention will become apparent to those ordinarily skilled in the art upon review of the following description of specific embodiments of the invention in conjunction with the accompanying Figures.

Similar references may be used in different figures to denote similar components or features.

DETAILED DESCRIPTION

Figure 1:
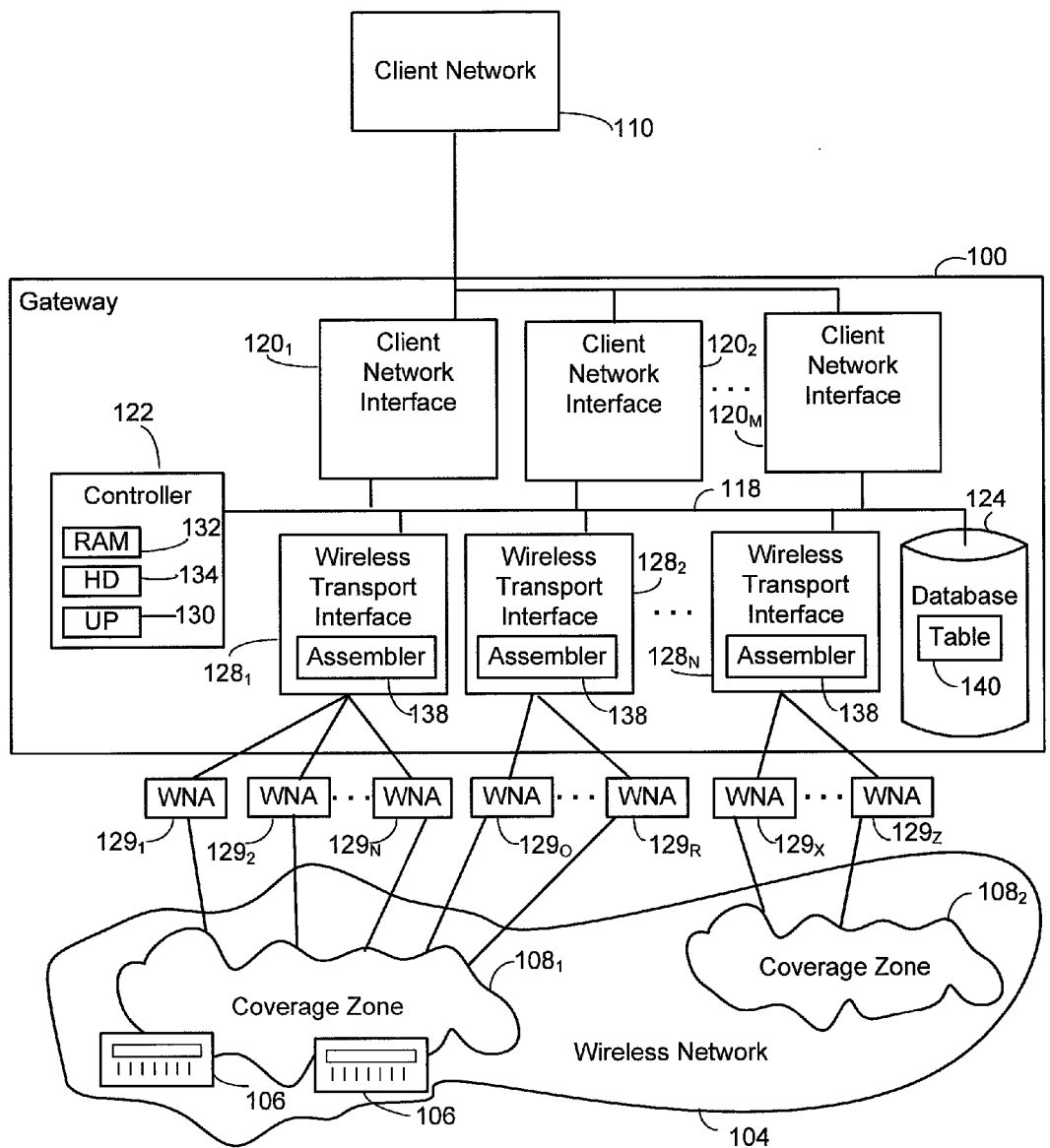
FIG. 1 is a block diagram showing a communications system including a computer network in which the present invention is implemented according to embodiments of the invention.

Referring to the drawings, FIG. 1 is a block diagram of a communications system that includes a networked computer system in which the present invention may be implemented. The networked computer system shown is a router or wireless gateway 100 that functions as an intermediary and interpreter between one or more client networks 110 and one or more wireless networks 104, allowing email messages to be exchanged between mobile devices 106 within the wireless network 104 and devices connected to the client network 110. In some example embodiments, the mobile devices 106 can access the Internet and World Wide Web through wireless network 104 and gateway 100.

The client network 110 will often be remotely located from the wireless gateway 100 and communicates over one or more communications links with the wireless gateway 100. Client network 110 will typically include a client side interface for handling email communications with the gateway 100. The email messages may, as well known in the art, include, among other things, plain text messages, HTML messages, and attached files of a wide variety of types. Client network 110 may also include an access point for the Internet and World Wide Web.

The wireless gateway 100 provides translation and routing services between one or more client networks 110 and wireless networks 104 to facilitate email communication between mobile devices 106 and devices connected, directly or indirectly, to client network 110. The wireless gateway 100 includes several distributed components including, among other things, client network interfaces $120_1$-$120_M$, at least one controller 122, a database 124, and wireless transport interfaces $128_1$-$128_N$. In order to provide increased capacity and backup redundancy when required, the gateway components are each preferably implemented using dedicated digital computers that are connected by a gateway network 118 (which may be a dedicated LAN). As known in the art, and as shown in respect of the Controller 122, the digital computer components each include, among other things, a microprocessor 130, a transient memory such as RAM 132, typically a persistent writable memory such as a flash memory and/or hard drive (HD) 134, and network communications interface cards. If one component, for example, wireless transport interface $128_k$ (where $1 \leq k \leq N$) crashes or otherwise becomes unavailable, another one or more of wireless transport interfaces 128 in the wireless gateway 100 that is associated with the same zone or area of wireless network 104 as the failed wireless transport interface 128 can pick up the traffic formerly handled by the failed wireless transport interface.

In the gateway 100 of FIG. 1, the client network interfaces 120 are each configured to manage the connection between the wireless gateway 100 and at least one client network 110. In one embodiment, the client network interfaces 120 maintain an open connection with one or more client side interfaces at the client network 110 and communicate therewith using a defined protocol.

The database 124 of the wireless gateway 100 stores data used by the other components of the wireless gateway 100 for administrative, tracking and message recovery purposes, and in this regard a number of the components of the wireless gateway 100 are configured to write to and read from the database 124. Among other things, the database stores configuration information for the wireless gateway components, keeps data as to the current status and state of the wireless gateway, stores information (including ID numbers and last known location) about the mobile devices 106 that communicate with the wireless gateway 100, and stores information about selected messages. The information stored by the database 124 assists with disaster/error recovery and can permit a backup component to take over the functions of a component that fails.

The wireless gateway 100 includes at least one controller in the form of controller 122 for controlling and coordinating operation of the gateway. Among other things the controller 122 monitors the operation of the components of gateway 100 by periodically polling the components for current state information, which the controller stores in the database 124. The controller 122 is configured to detect the failure or pending failure of components within the wireless gateway and coordinate other components to take over the functions of failed components.

The wireless transport interfaces 128 are the wireless gateway's interface to the mobile devices 106, and assemble messages that are destined for mobile devices into sequences of packets, the format of which is dependent on the specific wireless network 104. Similarly, as will be described in greater detail below, the wireless transport interfaces 128 recombine messages from mobile devices from sequences of packets sent from the mobile devices.

In an example embodiment of the invention, a group of wireless transport interfaces 128 will typically each communicate with mobile devices 106 located within a coverage zone or geographic area 108 within wireless network 104 through a plurality of associated wireless network adaptors 129. As shown in the example of FIG. 1, a first group that includes wireless transport interfaces $128_1$ and $128_2$ communicate through associated wireless network adaptors $129_1$-$129_N$ and $129_O$-$129_R$, respectively, with a first coverage area $108_1$. A further group that includes wireless transport interface $128_N$ and other wireless transport interfaces (not shown in FIG. 1) communicates with a further coverage zone $108_2$.

In one embodiment, wireless network adaptors have a TCP/IP connection to wireless transport interfaces 128 and an X.25 protocol connection to wireless network 104 such that the wireless network interface adaptors route packets from the wireless transport interfaces 128 over a TCP/IP connection to an X.25 mobile network connection and vice versa. The configuration of and requirement for wireless network adaptors 129 depend on the type of wireless network 104.

Wireless network 104 is in an example embodiments, a wireless packet data network, (e.g. Mobitex™ or DataTAC™), which provides radio coverage to mobile devices 106. Among other things, wireless mobile network 50 may also be a voice and data network such as GSM (Global System for Mobile Communication) and GPRS (General Packet Radio System), CDMA (Code Division Multiple Access), or various other third generation networks such as EDGE (Enhanced Data rates for GSM Evolution) or UMTS (Universal Mobile Telecommunications Systems). The coverage area 108 associated with a group of wireless transport interfaces 128 may cover a continuous geographic region, or may cover a series of discrete geographic regions. In some example embodiments, the coverage area 108 may include a plurality of sub-areas, each of which are served by one or a sub-set of the group of wireless transport interfaces 128, such that roaming among the wireless transport interfaces 128 within a group can occur as the mobile device 10 moves within coverage area 108. For example, the coverage area 108 may include a plurality of wireless base stations, each having an associated sub-area of coverage area 108, each of the base stations or sub-groups of the base stations within a sub-area or group of sub-areas of area 108 being coupled to a respective one or a respective sub-set of the group of wireless transport interfaces 128. Alternatively, in some embodiments, all of the wireless transport interfaces 128 within a group serving a coverage area 108 are able to receive messages that are directed towards them from substantially the entire coverage area 108.

Mobile devices 106 may be handheld or other mobile digital computing devices that are configured to send and receive email messages, and/or exchange voice and data over wireless network 104.

The present invention is not dependent on the particular protocol or methodologies used in gateway 100 to exchange messages between client network 110 and the wireless network 104. Rather, the present invention relates to assembly of data packets received at the gateway 100 from mobile devices 106 into messages.

When a mobile device 106 sends a message or "datagram", it breaks the datagram up into a sequence of associated data packets according to a predetermined protocol. A datagram can include just one data packet, or several data packets. The data packets for a single datagram from the mobile device are typically routed through a single wireless network adaptor 129 to its associated wireless transport interface 128, and reassembled at the wireless transport interface 128 for subsequent sending through a client network interface 120 to client network 110. However, in some situations, the data packets associated with a single datagram may end up being distributed among different wireless network adaptors 129 and different wireless transport interfaces 128 that are associated with the coverage area 108 that the sending mobile device 106 is located in. For example, distributed distribution of data packets among different wireless transport interfaces 128 could occur as the result of failure of a transport interface or wireless network adaptor, in which case a disaster prevention or recovery process orchestrated by the controller 122 could result in incoming data packets being switched from one wireless transport interface to another in the middle of a datagram. In another example, the shift of data packets from one wireless transport to another wireless transport 128 mid-datagram could be executed as part of a load balancing process orchestrated by controller 122. In another example, the shift of data packets from one wireless transport 128 to another mid-datagram could occur due to roaming as the mobile device moves within the coverage area 108.

Embodiments of the invention relate to the reassembly of datagrams or messages, particularly ones for which not all the data packets are received at the same wireless transport interface, but rather distributed among more than one wireless transport interface 128 serving a geographic coverage area or zone 108. In an example embodiment, the wireless transport interfaces 128 serving a geographic area 108 are configured to communicate over gateway network 118 to allow one wireless transport interface to take ownership for assembling data packets for a datagram that have been distributed among the group of wireless transport interfaces 128. In an example embodiment, the wireless transport interface 128 that receives the last data packet in a datagram takes ownership for reassembly and subsequent sending of the datagram to client network 110. A message or datagram assembler 138 is implemented on each wireless transport interface 128 for assembling data packets.

In order to facilitate communication among the wireless transport interfaces 128 that are associated with a geographic coverage area 108, in an example embodiment, database 124 includes a table 140 that identifies the "group" of wireless transport interfaces 128 associated with a particular geographic area 108 and which identifies a dedicated port or communications channel on gateway network 118 for communication purposes among the group of wireless transport interfaces 128. As will be explained in greater detail below, the group of wireless transport interfaces 128 associated with a geographical coverage area 108 use the assigned port to communicate ownership messages and exchange data packets as required.

Figure 2:
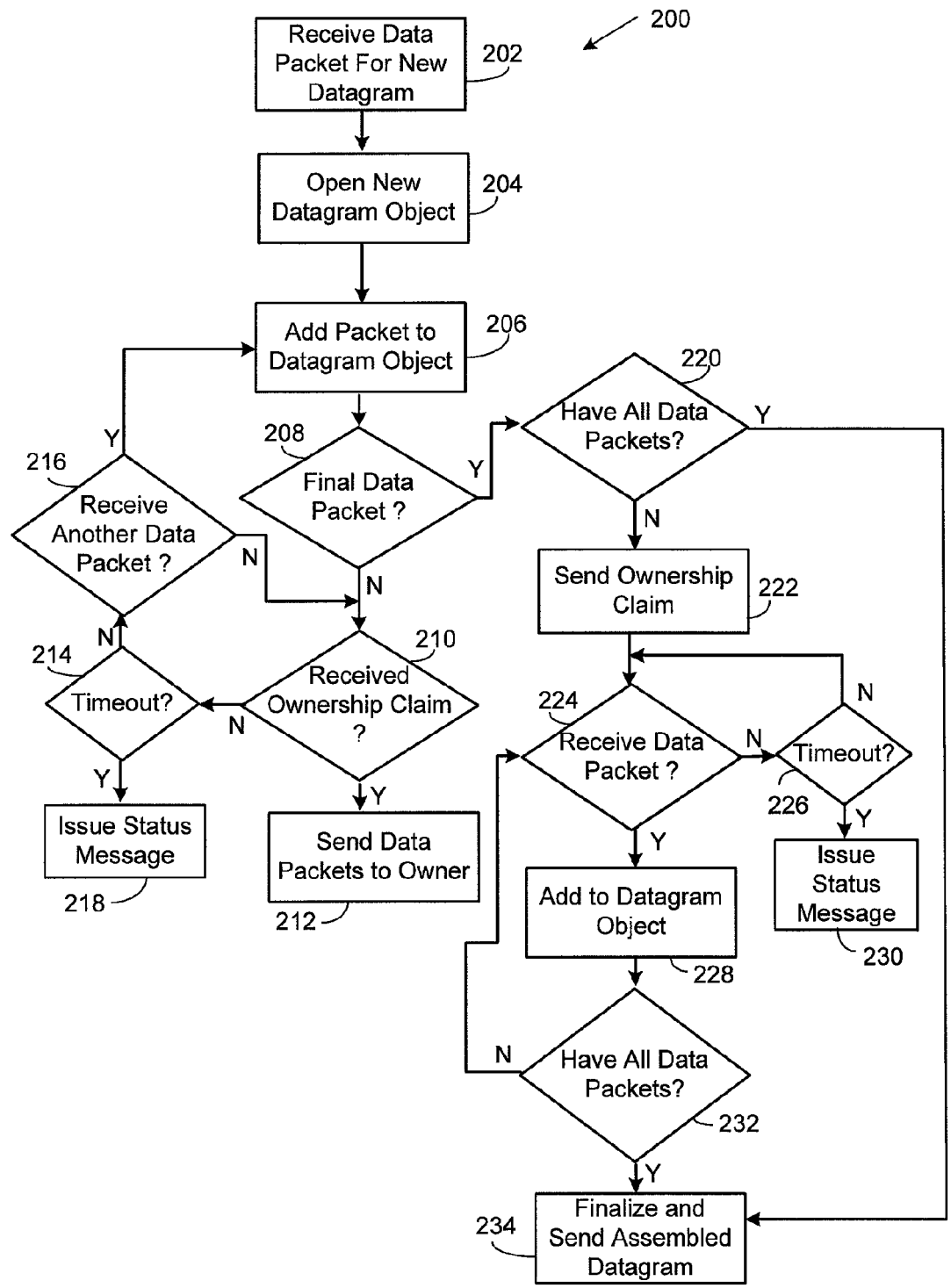
FIG. 2 is a flow diagram showing a datagram reassembly process according to example embodiments of the invention.
Figure 3:
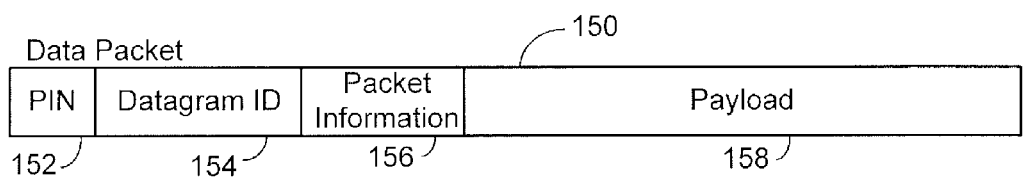
FIG. 3 is a block diagram representation of an example of a data packet.

FIG. 2 shows a datagram reassembly process, indicated generally by reference 200, implemented by a message or datagram assembler 138 implemented on each of the wireless transport interfaces 128 in the group associated with a coverage area 108. As represented in FIG. 3, a data packet 150 will typically include a payload 158 and header information including a PIN 152 identifying the mobile device from which the data packet originated, a datagram ID 154 identifying the datagram with which the data packet 150 is associated, and packet information 156. Packet information 156 includes information identifying where in the sequence of data packets of the datagram the data packet 150 is located. As noted above, a datagram may be just one data packet in length (in which case packet information 156 will include information indicating that the data packet is the only data packet in the datagram), or may be broken up into a number of data packets.

Turning again to FIG. 2, datagram reassembly process 200 begins, as indicated in step 202, when the subject wireless transport 128 receives from a mobile device 106 through a wireless network adaptor 129 its first data packet 150 of a datagram for which it has not previously received any other associated data packets. As indicated in step 204, the wireless transport interface 128 opens a new datagram object in its memory, and as indicated in step 206, adds the received data packet to the datagram object.

The wireless transport interface 128 then checks, as indicated in step 208, if the received data packet is the final data packet associated with the subject datagram. If it is the final packet then the wireless transport interface 128 assumes ownership of the entire datagram associated with the final data packet, and as indicated in step 220, checks the datagram object that it has been building to determine if it has all of the data packets of the datagram. As indicated in step 234, if the datagram object includes all packets of the datagram, the wireless transport interface 128 finalizes assembly of the datagram and then sends it on to its next destination (for example, a client network interface 120) in its journey to its ultimate destination.

Figure 4:
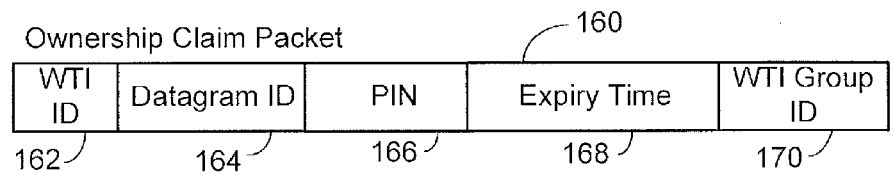
FIG. 4 is a block diagram representation of an example of an ownership claim packet.

Turning back again to step 220, if after receiving the final packet the wireless transport interface 128 determines that it does not have all the data packets associated with the datagram, it broadcasts an ownership claim for the datagram over gateway network 118 to all other wireless transport interfaces 128 that it shares the coverage area 108 with. As noted above, a port or communications channel on the network 118 may be dedicated for such purposes. FIG. 4 shows a block diagram representation of an ownership claim packet 160 broadcast by the wireless transport interface 128 over gateway network 118 in an example embodiment. The ownership claim packet 160 includes wireless transport interface ID 162 identifying the wireless transport interface 128 that is broadcasting the ownership claim; a datagram ID 164 identifying the datagram that the ownership claim is being made in respect of; a PIN 166 identifying the originating mobile device 106; and an Expiry Time 168 identifying a time after which the ownership claim can be ignored by the other wireless transport interfaces 128. In some example embodiments, especially where a dedicated communications channel between the wireless transport interfaces serving a coverage area is not used, the ownership claim packet 160 may include a WTI Group ID 170 that is associated with the group of wireless transport interfaces 170 serving a coverage area.

When the other wireless transport interfaces in the group serving the area receive the ownership claim, they each store it as an outstanding claim for the length set by the Expiry Time 168, and any data packets of the identified datagram that they have already received or which they receive prior to the end of the Expiry Time are sent over network 118 to the wireless transport interface 128 claiming ownership.

Turning again to process 200, after sending an ownership claim, the sending wireless transport interface 128 adds all of the data packets that it receives in reply to its ownership claim to the datagram object until all the data packets associated with the datagram have finally been received (steps 224, 228 and 232), after which it finalizes reassembly of the datagram and send the reassembled datagram onto its next destination (step 234). As indicated in steps 224, 226 and 230, the wireless transport interface that assumes ownership of a datagram having missing packets will, in at least one example embodiment, only keep waiting for the data packets for a predetermined duration, after which a suitable status message is issued (step 230) and process 200 ends for that particular datagram.

Turning again to step 208, in the event that a received data packet is not the final data packet in a datagram, the receiving wireless transport interface checks to see if the data packet is subject to any outstanding ownership claims that have been received from any of the other wireless transport interfaces. As suggested above, an ownership claim will be tracked as outstanding for the length of time specified by the Expiry Time defined in the ownership claim packet. If an outstanding ownership claim against the datagram associated with the received data packet is found, then, as indicated in step 212, all the data packets in the datagram object for the claimed datagram are sent over gateway network 118 to the wireless transport interface claiming ownership. The data packets are, in one embodiment, accompanied by a message from the transferring wireless transport interface that identifies the data packets that are being transferred.

In the event that there is no outstanding ownership claim against the datagram in step 210, the wireless transport interface then waits for a predetermined duration of time either to receive another data packet associated with the datagram, or for an ownership claim (steps 214, 216 and 210). If a further data packet of the datagram is received, steps 206 and onward are performed in respect of the newly received packet. If no additional data packets and no ownership request is received within the timeout period specified in step 214, then an appropriate status message is issued (step 218) and the process 200 ends in respect of the datagram.

Thus, in summary, once a wireless transport interface 128 receives a data packet for a datagram previously unknown to it, it will build a datagram object that includes the data packet and all subsequent data packets of the datagram received by the wireless transport. In the event that the wireless transport interface receives an ownership claim for the datagram from another wireless transport interface within a group associated with a predefined coverage area, it will transfer all of the data packets in the subject datagram object to the ownership claiming wireless transport interface. In the event that a data packet received by a wireless transport interface is the final data packet in a datagram, the receiving wireless transport will claim ownership of the datagram, and if missing any data packets of the datagram, it will send out an ownership claim to the other wireless transport interfaces of the group associated with the coverage area to solicit the missing data packets. Such a configuration is convenient when multiple wireless transport interfaces provide coverage to a geographic area for purposes of redundancy, scalability and load balancing. Such a configuration can also assist when roaming among a group of transport interfaces serving a defined coverage area occurs as a datagram distributed among more than one transport interface within the group can be rebuilt without requiring the mobile device to resend the entire datagram to a single transport interface. Thus, a wireless network can be broken up into coverage areas in which roaming is common, and each coverage area given an associated group of transport interfaces that can communicate among themselves to reassemble messages originating from within the coverage area.

Assigning the wireless transport interface that receives the last data packet as the owner of the datagram is convenient as it is relatively simple determination to make and the wireless transport interface receiving the last data packet will generally be the most likely wireless transport interface in the group to have the capacity to handle reassembly of the message. However, in some example embodiments, it is possible to use other criteria to assign ownership—for example the criteria for determining ownership could be the wireless transport interface receiving the penultimate data packet, or a threshold number of data packets, among other things.

It will be appreciated that the steps of process 200 could be performed in an order other than that specified above, and/or some steps altered or removed or additional steps added, with substantially the same end result. As suggested above, the coverage zone or area 108 served by a group of wireless transport interfaces could be a continuous or substantially continuous area, or could include a series of discrete areas which may be close together (for example, all within a given metro area), or which may be far apart (for example, areas on opposite sides of a country or continent).

In some example embodiments, step 202 of process 200 may include a sub-step of determining if the first data packet received by the wireless transport interface in respect of a new datagram is the only data packet in the datagram, and if so, then skip immediately to final step 234.

The above-described embodiments of the present invention are intended to be examples only. Alterations, modifications and variations may be effected to the particular embodiments by those skilled in the art without departing from the scope of the invention, which is defined by the claims appended hereto.

What is claimed is:

1. A method for assembling a message from a sequence of data packets in a communications system having a group of interface devices within a gateway, each configured with the same functionality for receiving and assembling messages transmitted as sequences of data packets from within a coverage area of a wireless communications network, wherein the group of interface devices operate in a same network layer, the method comprising:

receiving at one interface device of the group of interface devices within the gateway, each configured with the same functionality, from the wireless communication network at least one data packet of a sequence of data packets that collectively form a message;

receiving at said one interface device a request from another interface device of the group of interface devices for any data packets of the sequence of data packets of which at least one packet of the sequence has already been received by the another interface device to trigger the request from said another interface device which claims ownership of the sequence of data packets;

in response to said request, sending to said another interface device any data packets of said sequence of data packets received by the one interface device; and assembling the data packets of the sequence into the message at said another interface device.

2. The method of claim 1 wherein the group of interface devices are distributed computers connected by a wired network across which the request is sent.

3. The method of claim 1 wherein each of the group has a respective dedicated communications channel on the gateway for communicating requests for missing packets.

4. The method of claim 1 wherein the request comprises an interface device identifier identifying the another interface device and a sequence identifier identifying the sequence.

5. The method of claim 1 comprising monitoring at said one interface device for a request from any of the other interface devices of the group for data packets of a requested sequence.

6. The method of claim 1 wherein the request is based on the location of said at least one packet of the sequence received by the another interface device.

7. The method of claim 1 wherein the coverage area is a substantially continuous geographic area.

8. The method of claim 1 wherein the coverage area comprises a plurality of geographically dispersed areas.

9. An interface device connected to a group of interface devices within a gateway, each configured with the same functionality for receiving and assembling messages transmitted as sequences of data packets from within a coverage area of a wireless communications network, the group of interface devices being coupled for communicating there between, wherein the interface device and the group of interface devices operate in a same network layer, the interface device comprising:

a controller configured for:

receiving at said interface device of the group of interface devices within the gateway from the wireless communication network at least one data packet of a sequence of data packets that collectively form a message;

receiving at said interface device a request from another interface device of the group of interface devices for any data packets of the sequence of data packets of which at least one packet of the sequence has already been received by the another interface device to trigger the request from said another interface device which claims ownership of the sequence of data packets; and responding to said request by sending to said another interface device any data packets of said sequence of data packets received by the interface device for assembling the data packets of the sequence into the message at said another interface device.

10. The interface device of claim 9 wherein the interface device is configured to monitor for a request for missing data packets of a sequence from other interface devices in the group and upon receipt thereof to send over the gateway to the requesting interface device any missing data packets of the sequence that have been received thereby.

11. The interface device of claim 9 wherein each of the group has a respective dedicated communications channel on the gateway network for communicating requests for missing packets.

12. The interface device of claim 9 wherein said request is based on the location of said at least one packet of the sequence received by the another interface device.

13. A gateway for exchanging messages between a packet-based wireless communication network and a second communication network, the packet-based wireless communication network enabling a mobile device to transmit a message as a sequence of data packets, the gateway comprising:

a gateway network;

a group of interface devices, each configured with the functionality to receive and assemble data packets into messages, for receiving messages transmitted as sequences of data packets from within a coverage area of the wireless communications network, the group of interface devices being coupled to the gateway network for communicating there between, wherein the group of interface devices operate in a same network layer, each of the interface devices comprising a controller configured for:

receiving at the interface device of the group of interface devices within the gateway from the wireless communication network at least one data packet of a sequence of data packets that collectively form a message;

receiving at the interface device a request from another interface device of the group of interface devices for any data packets of the sequence of data packets of which at least one packet of the sequence has already been received by the another interface device to trigger the request from said another interface device which claims ownership of the sequence of data packets; and responding to said request by sending to said another interface device any data packets of said sequence of data packets received by the interface device for assembling the data packets of the sequence into the message at said another interface device.

14. The gateway of claim 13 wherein the gateway network is configured to send each data packet over the wireless network to a single interface device.

15. The gateway of claim 13 wherein each interface device is configured to monitor for a request for missing data packets of a sequence from other interface devices in the group and upon receipt thereof to send over the gateway network to the requesting interface device any missing data packets of the sequence that have been received thereby.

16. The gateway of claim 13 wherein each of the group has a respective dedicated communications channel on the gateway network for communicating requests for missing packets.

17. The gateway of claim 13 further comprising a plurality of wireless network adaptors associated with each interface device for converting data packets received from the coverage area from a first protocol to a second protocol suitable for the interface devices.

18. The gateway of claim 13 wherein the request is based on the location of said at least one packet of the sequence received by the another interface device.

19. The gateway of claim 13 wherein the coverage area is a substantially continuous geographic area.

20. The gateway of claim 13 wherein the coverage area comprises a plurality of geographically dispersed areas.

21. An interface device connected to a group of interface devices within a gateway, each configured with the same functionality for receiving and assembling messages transmitted as sequences of data packets from within a coverage area of a wireless communications network, the group of interface devices being coupled for communicating there between, wherein the interface device and the group of interface devices operate in a same network layer, the interface device comprising:

means for receiving at said interface device of the group of interface devices within the gateway from the wireless communication network at least one data packet of a sequence of data packets that collectively form a message;

means for receiving at said interface device a request from another interface device of the group of interface devices for any data packets of the sequence of data packets of which at least one packet of the sequence has already been received by the another interface device to trigger the request from said another interface device which claims ownership of the sequence of data packets; and means responsive to said request for sending to said another interface device any data packets of said sequence of data packets received by the interface device for assembling the data packets of the sequence into the message at said another interface device.

\* \* \* \* \*